United States Patent
Tian et al.

(10) Patent No.: US 10,296,827 B2
(45) Date of Patent: May 21, 2019

(54) DATA CATEGORY IDENTIFICATION METHOD AND APPARATUS BASED ON DEEP NEURAL NETWORK

(71) Applicant: Huawei Technologies Co., Ltd., Shenzhen (CN)

(72) Inventors: Guangjian Tian, Hong Kong (HK); Cheng He, Shenzhen (CN); Wei Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 14/944,294

(22) Filed: Nov. 18, 2015

(65) Prior Publication Data

US 2016/0071010 A1   Mar. 10, 2016

Related U.S. Application Data

(63) Continuation of application No. PCT/CN2014/089591, filed on Oct. 27, 2014.

(30) Foreign Application Priority Data

May 31, 2014   (CN) .......................... 2014 1 0242182

(51) Int. Cl.
  *G06N 3/08*    (2006.01)
  *G06N 3/06*    (2006.01)
(52) U.S. Cl.
  CPC ................. *G06N 3/08* (2013.01); *G06N 3/06* (2013.01)
(58) Field of Classification Search
  None
  See application file for complete search history.

(56) References Cited

U.S. PATENT DOCUMENTS

| | | | |
|---|---|---|---|
| 6,944,602 B2 | 9/2005 | Cristianini | ........... G06K 9/6215 |
| | | | 706/12 |
| 2003/0149676 A1 | 8/2003 | Kasabov | |

(Continued)

FOREIGN PATENT DOCUMENTS

| | | |
|---|---|---|
| CN | 102004801 A | 4/2011 |
| CN | 102651088 A | 8/2012 |

(Continued)

OTHER PUBLICATIONS

Partial English Translation and Abstract of Chinese Patent Application No. CN103345656, Nov. 6, 2015, 4 pages.

(Continued)

*Primary Examiner* — Li Wu Chang
(74) *Attorney, Agent, or Firm* — Conley Rose, P.C.

(57) ABSTRACT

A deep neural network to which data category information is added is established locally, to-be-identified data is input to an input layer of the deep neural network generated based on the foregoing data category information, and information of a category to which the to-be-identified data belongs is acquired, where the information of the category is output by an output layer of the deep neural network. A deep neural network is established based on data category information, such that category information of to-be-identified data is conveniently and rapidly obtained using the deep neural network, thereby implementing a category identification function of the deep neural network, and facilitating discovery of an underlying law of the to-be-identified data according to the category information of the to-be-identified data.

12 Claims, 4 Drawing Sheets

(56) References Cited

U.S. PATENT DOCUMENTS

2014/0067735 A1     3/2014    Yu et al.
2016/0110642 A1     4/2016    Matsuda .................. G06N 3/08
                                                                                               706/25

FOREIGN PATENT DOCUMENTS

CN            103336992 A     10/2013
CN            103345656 A     10/2013

OTHER PUBLICATIONS

Snoek, J., et al., "Nonparametric Guidance of Autoencoder Representations using Label Information," Journal of Machine Learning Research 13, 2012, pp. 2567-2588.

Foreign Communication From A Counterpart Application, PCT Application No. PCT/CN2014/089591, English Translation of International Search Report dated Feb. 27, 2015, 2 pages.

Machine Translation and Abstract of Chinese Publication No. CN102651088, Aug. 29, 2012, 9 pages.

Vailaya, A., et al., "Image Classification for Content-Based Indexing," IEEE Transactions on Image Processing, vol. 10, No. 1, Jan. 2001, pp. 117-130.

Fan, W., et al., "Neural network based identification of deception jamming," Radar and Ecm, No. 2, 2007, pp. 13-45.

Foreign Communication From a Counterpart Application, Chinese Application No. 201410242182.3, Chinese Office Action dated May 19, 2017, 9 pages.

Bengio et al. "Greedy Layer-Wise Training of Deep Networks", NIPS 2006, pp. 8.

DATA CATEGORY IDENTIFICATION METHOD AND APPARATUS BASED ON DEEP NEURAL NETWORK

CROSS-REFERENCE TO RELATED APPLICATIONS

This application is a continuation of International Application No. PCT/CN2014/089591, filed on Oct. 27, 2014, which claims priority to Chinese Patent Application No. 201410242182.3, filed on May 31, 2014, both of which are hereby incorporated by reference in their entireties.

TECHNICAL FIELD

The present disclosure relates to the field of machine learning technologies, and in particular, to a data category identification method and apparatus based on a deep neural network.

BACKGROUND

With rapid development of computer technologies, computers are becoming more powerful, and application fields are becoming wider. Deep learning is a new field of a machine learning process and aims to establish a neural network that simulates a human brain for analysis and learning, and a category to which data belongs is identified by using the neural network.

In deep learning, "deep" is mainly contrasted with shallow neural network learning when a computer data processing capability is relatively low, and indicates that a neural network has many layers, where there are a large number of neurons at each layer; and "learning" means training a machine such as a computer to identify features of sample data, such as image information and text information. Therefore, it can be seen that, in deep learning, data features are extracted from original data by using a neural network, and these currently unexplainable features usually make a classification effect better.

At present, in a process of training a deep neural network, an unsupervised auto-encoding model is used at each layer, and using the unsupervised autoencoder model to train the deep neural network can minimize a reconstruction error. However, because the unsupervised autoencoder model does not have category information of sample data, a finally obtained deep neural network cannot acquire category information corresponding to input sample data.

Therefore, it can be seen that a problem that a deep neural network fails to identify data category information during data identification exists.

SUMMARY

Embodiments of the present disclosure provide a data category identification method and apparatus based on a deep neural network, so as to solve a problem that a deep neural network fails to identify data category information during data identification.

Technical solutions provided in the embodiments of the present disclosure are as follows.

According to a first aspect, a data category identification method based on a deep neural network is provided, including establishing an initial deep neural network; generating a linear category analysis function after data category information is added to a locally saved initial linear category analysis function according to an input training sample vector set; acquiring an optimization function of the initial deep neural network according to a locally saved unsupervised auto-encoding model optimization function and the linear category analysis function; acquiring a parameter of the initial deep neural network according to the optimization function of the initial deep neural network; establishing a deep neural network according to a locally saved classification neural network, the initial deep neural network, and the parameter of the initial deep neural network, where the deep neural network has a multi-layer network structure that includes at least an input layer and an output layer; and inputting to-be-identified data to the input layer of the deep neural network, and acquiring information of a category to which the to-be-identified data belongs, where the information of the category is output by the output layer of the deep neural network.

With reference to the first aspect, in a first possible implementation manner, relaxation processing is performed on the initial linear category analysis function using a relaxation algorithm, and normalization processing is performed on the input training sample vector set; and the training sample vector set on which normalization processing has been performed is substituted into the initial linear category analysis function on which relaxation processing has been performed, to generate the linear category analysis function.

With reference to the first possible implementation manner of the first aspect, in a second possible implementation manner, the linear category analysis function is:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\},$$

where $\zeta_{lda}(W)$ is the linear category analysis function; W is a parameter of the deep neural network, W is a matrix including multiple elements, and the matrix is obtained by learning the training sample vector set on which normalization processing has been performed; $w_k$ is any column vector in the matrix W; $w^T_k$ is a transposition of the column vector $w_k$; both $x_i$ and $x_j$ are training sample vectors in the training sample vector set on which normalization processing has been performed; $x_j^T$ is a transposition of $x_j$; M is a vector pair set including at least one pair of training sample vectors that belong to different categories; C is a vector pair set including at least one pair of training sample vectors that belong to a same category; $(x_i, x_j) \in M$ indicates that $x_i$ and $x_j$ belong to different categories; $(x_i, x_j) \in C$ indicates that $x_i$ and $x_j$ belong to a same category; and K is the total number of column vectors included in the matrix W.

With reference to the first aspect, the first possible implementation manner of the first aspect, or the second possible implementation manner of the first aspect, in a third possible implementation manner, the optimization function of the initial deep neural network is: $\zeta = \alpha \zeta_{ae}(W) + (1-\alpha) \zeta_{lda}(W)$, where $\alpha$ is a coefficient of the optimization function of the initial deep neural network, and is preset and acquired according to an application scenario; $\zeta_{ae}(W)$ is the unsupervised auto-encoding model optimization function; $\zeta_{lda}(W)$ is the linear category analysis function; and $\zeta$ is the optimization function of the initial deep neural network.

With reference to the first aspect, the first possible implementation manner of the first aspect, the second possible implementation manner of the first aspect, or the third possible implementation manner of the first aspect, in a fourth possible implementation manner, a gradient corresponding to the optimization function of the initial deep neural network is acquired according to the optimization function of the initial deep neural network and using a backpropagation algorithm; and the parameter of the initial deep neural network is acquired using a gradient descent algorithm or a quasi-Newton algorithm and according to the gradient corresponding to the optimization function of the initial deep neural network.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the classification neural network is superimposed onto the initial deep neural network to generate an initial deep neural network that is obtained after superimposition processing; and the deep neural network is established using the backpropagation algorithm and according to the parameter of the initial deep neural network and the initial deep neural network that is obtained after superimposition processing.

According to a second aspect, a data category identification apparatus based on a deep neural network is provided, including a first establishing unit configured to establish an initial deep neural network; a generating unit configured to generate a linear category analysis function after data category information is added to a locally saved initial linear category analysis function according to an input training sample vector set; an optimization function acquiring unit configured to acquire an optimization function of the initial deep neural network according to a locally saved unsupervised auto-encoding model optimization function and the linear category analysis function; a parameter acquiring unit configured to acquire a parameter of the initial deep neural network according to the optimization function of the initial deep neural network; a second establishing unit configured to establish a deep neural network according to a locally saved classification neural network, the initial deep neural network, and the parameter of the initial deep neural network, where the deep neural network has a multi-layer network structure that includes at least an input layer and an output layer; and a data category identifying unit configured to input to-be-identified data to the input layer of the deep neural network, and acquire information of a category to which the to-be-identified data belongs, where the information of the category is output by the output layer of the deep neural network.

With reference to the second aspect, in a first possible implementation manner, the generating unit is configured to perform relaxation processing on the initial linear category analysis function using a relaxation algorithm, and perform normalization processing on the input training sample vector set; and substitute the training sample vector set on which normalization processing has been performed into the initial linear category analysis function on which relaxation processing has been performed, to generate the linear category analysis function.

With reference to the first possible implementation manner of the second aspect, in a second possible implementation manner, the linear category analysis function generated by the generating unit is:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\}$$

where $\zeta_{lda}(W)$ is the linear category analysis function; W is a parameter of the deep neural network, W is a matrix including multiple elements, and the matrix is obtained by learning the training sample vector set on which normalization processing has been performed; $w_k$ is any column vector in the matrix W; $W^T_k$ is a transposition of the column vector $w_k$; both $x_i$ and $x_j$ are training sample vectors in the training sample vector set on which normalization processing has been performed; $X_j^T$ is a transposition of $x_j$; M is a vector pair set including at least one pair of training sample vectors that belong to different categories; C is a vector pair set including at least one pair of training sample vectors that belong to a same category; $(x_i, x_j) \in M$ indicates that $x_i$ and $x_j$ belong to different categories; $(x_i, x_j) \in C$ indicates that $x_i$ and $x_j$ belong to a same category; and K is the total number of column vectors included in the matrix W.

With reference to the second aspect, the first possible implementation manner of the second aspect, or the second possible implementation manner of the second aspect, in a third possible implementation manner, the optimization function, which is acquired by the optimization function acquiring unit, of the initial deep neural network is: $\zeta = \alpha \zeta_{ae}(W) + (1-\alpha) \zeta_{lda}(W)$, where $\alpha$ is a coefficient of the optimization function of the initial deep neural network, and is preset and acquired according to an application scenario; $\zeta_{ae}(W)$ is the unsupervised auto-encoding model optimization function; $\zeta_{lda}(W)$ is the linear category analysis function; and $\zeta$ is the optimization function of the initial deep neural network.

With reference to the second aspect, the first possible implementation manner of the second aspect, the second possible implementation manner of the second aspect, or the third possible implementation manner of the second aspect, in a fourth possible implementation manner, the parameter acquiring unit is configured to acquire, according to the optimization function of the initial deep neural network and using a backpropagation algorithm, a gradient corresponding to the optimization function of the initial deep neural network; and acquire, using a gradient descent algorithm or a quasi-Newton algorithm, the parameter of the initial deep neural network according to the gradient corresponding to the optimization function of the initial deep neural network.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the second establishing unit is configured to superimpose the classification neural network onto the initial deep neural network to generate an initial deep neural network that is obtained after superimposition processing; and establish, using the backpropagation algorithm, the deep neural network according to the parameter of the initial deep neural network and the initial deep neural network that is obtained after superimposition processing.

In the embodiments of the present disclosure, a deep neural network to which data category information is added is established locally, to-be-identified data is input to an input layer of the deep neural network generated based on the foregoing data category information, and information of a category to which the to-be-identified data belongs is acquired, where the information of the category is output by an output layer of the deep neural network. Using the technical solutions of the present disclosure, a deep neural network is established based on data category information, such that category information of to-be-identified data is conveniently and rapidly obtained using the deep neural network, thereby implementing a category identification function of the deep neural network, and facilitating discovery of an underlying law of the to-be-identified data according to the category information of the to-be-identified data.

DESCRIPTION OF EMBODIMENTS

To solve a problem that a deep neural network fails to identify data category information during data identification, in embodiments of the present disclosure, a deep neural network to which data category information is added is established locally, to-be-identified data is input to an input layer of the deep neural network generated based on the foregoing data category information, and information of a category to which the to-be-identified data belongs is acquired, where the information of the category is output by an output layer of the deep neural network. Using the technical solutions of the present disclosure, a deep neural network is established based on data category information, such that category information of to-be-identified data is conveniently and rapidly obtained using the deep neural network, thereby implementing a category identification function of the deep neural network, and facilitating discovery of an underlying law of the to-be-identified data according to the category information of the to-be-identified data.

The embodiments of the present disclosure are described in further detail in the following with reference to the accompanying drawings of this specification.

Figure 1:
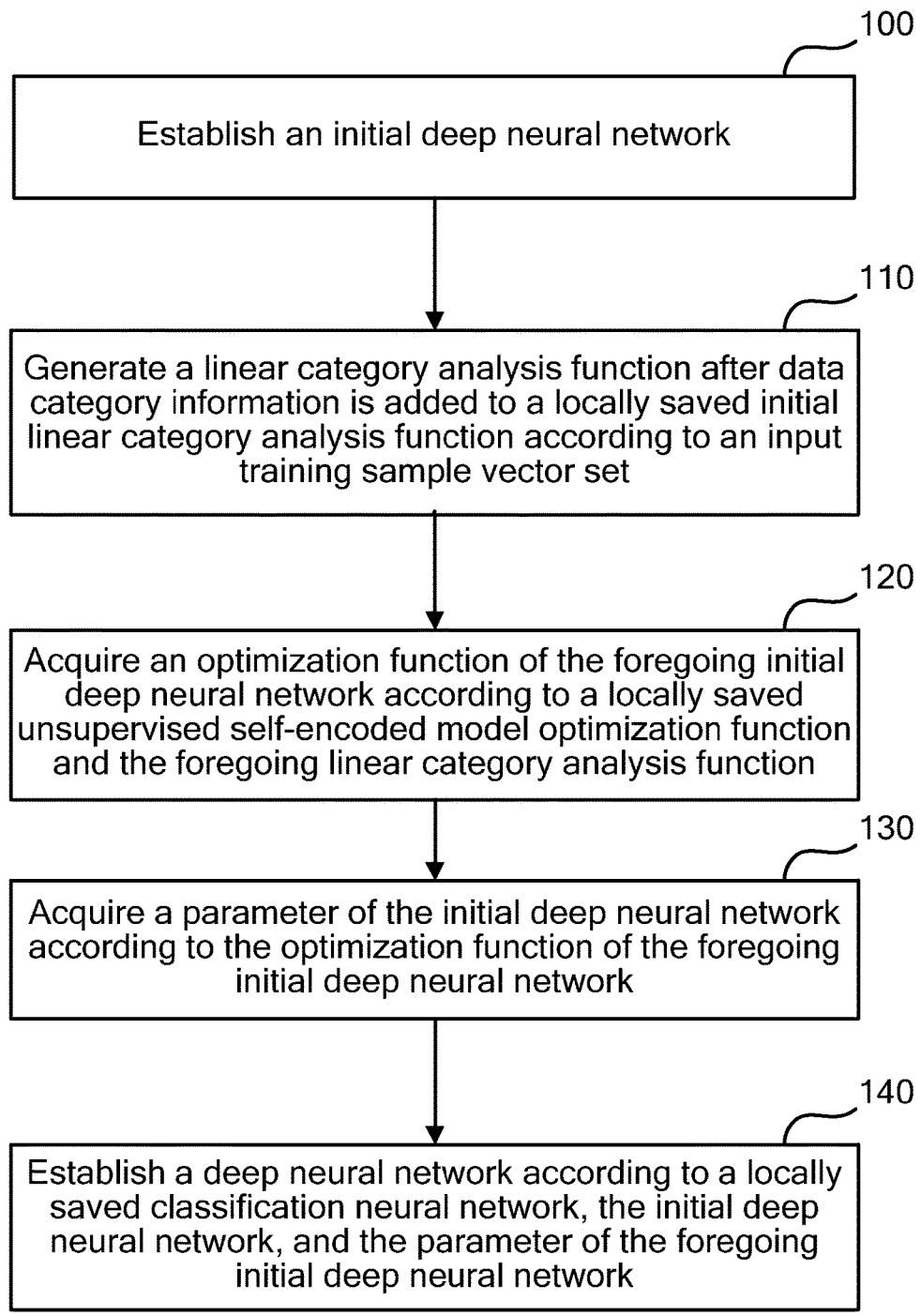
FIG. 1 is a flowchart of establishment of a deep neural network according to an embodiment of the present disclosure.

Before category identification is performed on to-be-identified data, a deep neural network needs to be established locally. As shown in FIG. 1, a process of establishing a deep neural network is as follows.

Step 100: Establish an initial deep neural network.

Step 110: Generate a linear category analysis function after data category information is added to a locally saved initial linear category analysis function according to an input training sample vector set.

In this embodiment of the present disclosure, an input training sample vector set (recorded as X) is received, and each training sample vector set may be expressed as $X = \{x_1, x_2, \ldots, x_i, \ldots, x_n\}$. Each training sample vector $x_i$ in the training sample vector set X represents a vector including multiple pieces of training sample data, and the training sample vector $x_i$ corresponds to multiple dimensions, for example, the training sample vector $x_i$ in the training sample vector set X may be expressed as: $x_i = \{x_{i1}, x_{i2}, \ldots, x_{id}\}$, where d is the number of dimensions of the training sample vector $x_i$. A category information set (recorded as Y) corresponding to the foregoing training sample vector set may be expressed as: $Y = \{y_1, y_2, \ldots, y_j, \ldots, y_n\}$, and each element in the category information set is known. Optionally, each training sample vector in the foregoing training sample vector set X has category information corresponding to each training sample vector, and each element ($y_j$) included in the category information set Y represents one kind of category information. Category information corresponding to each training sample vector in the training sample vector set X is included in the category information set Y, for example, category information corresponding to a training sample vector $x_1$ is an element $y_1$, category information corresponding to a training sample vector $x_2$ is an element $y_2$, and so on, and category information corresponding to a training sample vector $x_n$ is an element $y_n$.

Optionally, normalization processing is performed on training sample vectors in the input training sample vector set X, such that values of training sample data in all the training sample vectors are less than or equal to 1 and greater than or equal to 0. Using the foregoing technical solution, normalization processing is performed on training sample data in a training sample vector set, such that each piece of training sample data in the training sample vector set is within a preset range, thereby avoiding a problem of inconsistent quantity dimensions during subsequent establishment of a deep neural network, and ensuring accuracy of the established deep neural network.

Optionally, the locally saved initial linear category analysis function is acquired, where the initial linear category analysis function may be expressed using the following formula:

$$\zeta_{lda}(W')_{initial} = \frac{w_k'^T S_b w_k'}{w_k'^T S_w w_k'} \quad \text{(Formula 1)}$$

where $\zeta_{lda}(W')_{initial}$ is the initial linear category analysis function; W' is a matrix corresponding to the initial linear category analysis function; $w_k'$ is any column vector in the foregoing matrix W; $w_k'^T$ is a transposition of $w_k'$;

$$S_b = \sum_{k=1}^{c} N_k (v^{(k)} - v)(v^{(k)} - v)^T;$$

$$S_w = \sum_{k=1}^{c} \left( \sum_{i=1}^{N_k} (x_i^{(k)} - v^{(k)})(x_i^{(k)} - v^{(k)})^T \right);$$

$v^{(k)}$ is a mean value of training sample vectors of a $k^{th}$ category; $v$ is a mean value of all training sample vectors; $N_k$ is the number of the training sample vectors of the $k^{th}$ category; c is the number of categories corresponding to the training sample vector; $x_i^{(k)}$ is a training sample vector of the $k^{th}$ category; $(v^{(k)} - v)^T$ is a transposition of $(v^{(k)} - v)$; and $(x_i^{(k)} - v^{(k)})^T$ is a transposition of $(x_i^{(k)} - v^{(k)})$.

Optionally, relaxation processing is performed on the foregoing initial linear category analysis function, that is, in a case in which accuracy of a data classification result is ensured, a restriction condition in a classic initial linear category analysis function is relaxed; and the training sample vector set on which normalization processing has been performed is substituted into the foregoing initial linear category analysis function on which relaxation processing has been performed, to generate a linear category analysis function. The generated linear category analysis function may be expressed using the following formula:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\} \quad \text{(Formula 2)}$$

where $\zeta_{lda}(W)$ is the linear category analysis function; W is a matrix corresponding to a deep neural network, that is, a parameter of the deep neural network, and is obtained by learning the training sample vector set on which normalization processing has been performed; $w_k$ is any column vector in the foregoing matrix W and is obtained by learning the training sample vector set on which normalization processing has been performed; $w_k^T$ is a transposition of the column vector $w_k$ and is obtained by learning the training sample vector set on which normalization processing has been performed; both $x_i$ and $x_j$ are sample vectors in the foregoing training sample vector set X on which normalization processing has been performed; $x_j^T$ is a transposition of $x_j$; M is a vector pair set including at least one pair of training sample vectors that belong to different categories, and all training sample vector pairs included in the set M belong to a same category, for example, M may be expressed as $\{(x_1,x_2), \ldots, (x_{n-1},x_n)\}$, where $x_1$ and $x_2$ belong to a same category and $x_{n-1}$ and $x_n$ belong to a same category; C is a vector pair set including at least one pair of training sample vectors that belong to a same category, and all training sample vector pairs included in the set C belong to different categories; $(x_i, x_j) \in M$ indicates that $x_i$ and $x_j$ belong to different categories, that is, category information $y_i$ corresponding to $x_i$ is different from category information $y_j$ corresponding to $x_j$; $(x_i, x_j) \in C$ indicates that $x_i$ and $x_j$ belong to a same category, that is, category information $y_i$ corresponding to $x_i$ is the same as category information $y_j$ corresponding to $x_j$; and K is the number of column vectors $w_k$ included in the matrix W, and is obtained by learning the training sample vector set.

Using the foregoing technical solution, because category information corresponding to the training sample vector set is known, that is, a category information set Y corresponding to a training sample is known, both $(x_i,x_j) \in C$ and $(x_i,x_j) \in M$ in Formula 2 need to be applied to information of a category to which the training sample vector belongs, which indicates that $y_i$ corresponding to a training sample vector $x_i$ and $y_j$ corresponding to a training sample vector $x_j$ are acquired from the category information set Y, and it is determined whether $x_i$ and $x_j$ belong to a same category. Therefore, it can be seen that, a generated linear category analysis function includes data category information, such that a generated deep neural network can identify information of a category to which to-be-identified data belongs.

During the foregoing calculation of the linear category analysis function, only some training sample vectors (such as $x_1$ and $x_2$) in the training sample vector set X may be used, but not all training sample vectors need to be used. Which training sample vectors are selected from the training sample vector set X as some training sample vectors may be pre-configured according to a specific situation.

Using the foregoing technical solution, relaxation processing is performed on a locally saved initial linear category analysis function, and a restriction condition corresponding to a function during establishment of a deep neural network is blurred, thereby avoiding a problem in the prior art that an amount of calculation of an initial linear category analysis function is large, and effectively reducing calculation complexity on the basis that accuracy of identifying a data category by an established deep neural network is ensured.

Step 120: Acquire an optimization function of the foregoing initial deep neural network according to a locally saved unsupervised auto-encoding model optimization function and the foregoing linear category analysis function.

In this embodiment of the present disclosure, the locally saved unsupervised auto-encoding model optimization function is expressed using the following formula:

$$\zeta_{ae}(W) = \sum_{i=1}^{n} L(x_i, \hat{x}_i) \quad \text{(Formula 3)}$$

where $\zeta_{ae}(W)$ is the unsupervised auto-encoding model optimization function; W is a parameter of the deep neural network, the parameter is a matrix including multiple elements, and the matrix is obtained by learning the training sample vector set on which normalization processing has been performed; $x_i$ is a training sample vector in the training sample vector set on which normalization processing has been performed; $\hat{x}_i$ is a training sample vector in a reestablished training sample vector set acquired after the training sample vector set on which normalization processing has been performed is reestablished; and n is the number of training sample vectors included in the training sample vector set on which normalization processing has been performed.

Optionally, $L(x_i, \hat{x}_i)$ may be expressed using either of the following two formulas:

$$L(x_i, \hat{x}_i) = \|x_i - \hat{x}_i\|^2 \quad \text{(Formula 4)}$$

$$L(x_i, \hat{x}_i) = -x_i \log \hat{x}_i + (1-x_i) \log (1-\hat{x}_i) \quad \text{(Formula 5)}$$

where $x_i$ is a training sample vector in the training sample vector set on which normalization processing has been performed; $\hat{x}_i$ is a training sample vector in a reestablished training sample vector set acquired after the training sample vector set on which normalization processing has been performed is reestablished; and $\|x_i - \hat{x}_i\|$ represents a Euclidean distance between $x_i$ and $\hat{x}_i$.

Optionally, $\hat{x}_i$ in the foregoing Formula 3 to Formula 5 may be expressed using the following formula:

$$\hat{x}_i = S_g[W^T S_f(W x_i + b) + c] \quad \text{(Formula 6)}$$

where both $S_g$ and $S_f$ are excitation functions, and both $S_g$ and $S_f$ are sigmoid functions or tan h (hyperbolic tangent) functions; b and c are offset vectors, which are obtained by learning the training sample vector set X, or both b and c are set to 0; and $W^T$ is a transposition of the matrix W.

Optionally, the linear category analysis function is integrated into the foregoing unsupervised auto-encoding model optimization function, to generate an optimization function of the initial deep neural network. The optimization function, which is generated by integrating the linear category analysis function into the foregoing unsupervised auto-encoding model optimization function, of the initial deep neural network may be expressed using the following formula:

$$\zeta = \alpha \zeta_{ae}(W) + (1-\alpha) \zeta_{lda}(W) \quad \text{(Formula 7)}$$

where $\alpha$ is a coefficient of the optimization function of the initial deep neural network, and is preset and acquired according to an application scenario, and $\alpha$ is greater than or equal to 0 and less than or equal to 1; $\zeta_{ae}(W)$ is the unsupervised auto-encoding model optimization function; $\zeta_{lda}(W)$ is the linear category analysis function; and $\zeta$ is the optimization function of the initial deep neural network.

Step 130: Acquire a parameter of the initial deep neural network according to the optimization function of the foregoing initial deep neural network.

In this embodiment of the present disclosure, a process of acquiring the parameter of the initial deep neural network according to the acquired optimization function of the foregoing initial deep neural network is acquiring, using a backpropagation algorithm, a gradient corresponding to the optimization function of the foregoing initial deep neural network; and acquiring, using a gradient descent algorithm or a quasi-Newton algorithm, parameters (W, b and c) of the foregoing initial deep neural network according to the gradient of the optimization function of the foregoing initial deep neural network.

Step 140: Establish a deep neural network according to a locally saved classification neural network, the initial deep neural network, and the parameter of the foregoing initial deep neural network.

In this embodiment of the present disclosure, the locally saved classification neural network is superimposed onto the foregoing initial deep neural network; and the deep neural network is established using the backpropagation algorithm and according to an initial deep neural network that is obtained after superimposition processing. The deep neural network has a multi-layer network structure that includes at least an input layer and an output layer; and a parameter of the foregoing deep neural network is based on the parameter of the foregoing initial deep neural network; and the foregoing classification neural network is a multi-layer perceptron model or a logistic regression model.

Optionally, a process of superimposing the locally saved classification neural network onto the foregoing initial deep neural network is performing optimization processing, using the backpropagation algorithm, on the initial deep neural network expressed by Formula 7, to obtain a parameter of a layer of a neural network; calculating a result of $S(Wx_i+b)$, and using the calculation result as an input of a next layer of the neural network, where S is a sigmoid function or a tan h (hyperbolic tangent) function; and repeating the foregoing steps L times, such that a deep neural network, that is, a neural network including L layers, can be established.

Optionally, a function corresponding to the generated deep neural network may be expressed using the following formula:

$$\kappa = S\{W_L S[W_{L-1} S(W_2 S(W_1 x_i))]\} \quad \text{Formula 8}$$

where $\kappa$ is the function corresponding to the deep neural network; and $W_1$, $W_2$, L, and $W_L$ are parameters of different layers of neural networks in the deep neural network, where initial values of the parameters are acquired by learning the foregoing training sample vector set. For $W_1$, $W_2$, L, and $W_L$ corresponding to the initial values, iteration and optimization are further performed on $W_1$, $W_2$, . . . , $W_L$ using the backpropagation algorithm, to obtain a final deep neural network.

Figure 2:
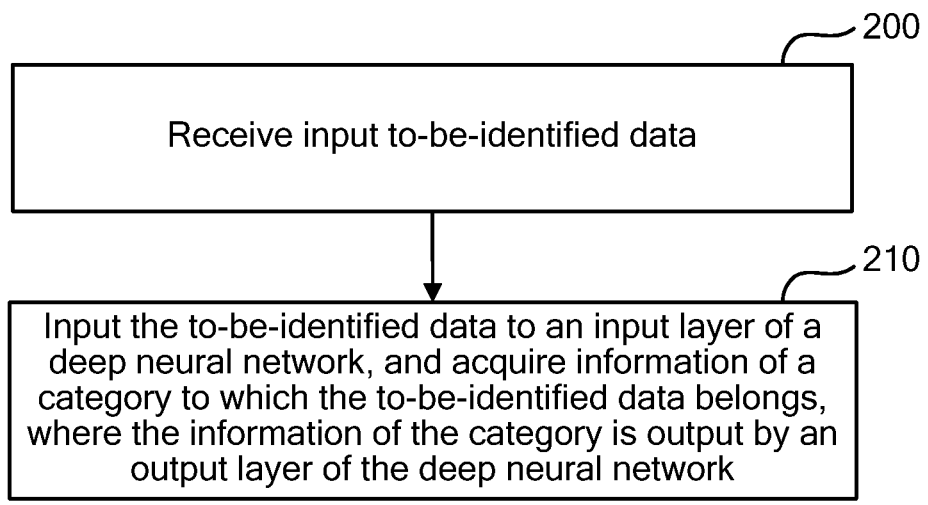
FIG. 2 is a flowchart of performing data category identification based on a deep neural network according to an embodiment of the present disclosure.

As shown in FIG. 2, in this embodiment of the present disclosure, a process of performing data category identification based on a deep neural network is as follows.

Step 200: Receive input to-be-identified data.

In this embodiment of the present disclosure, to-be-identified data input by a user is received or to-be-identified data sent by another device is received, where a device receiving the to-be-identified data is a device having a data processing capability. An example that the to-be-identified data is processed by a computer is used as an example for detailed description in the following.

Step 210: Input the to-be-identified data to an input layer of a deep neural network, and acquire information of a category to which the to-be-identified data belongs, where the information of the category is output by an output layer of the deep neural network.

Figure 3:
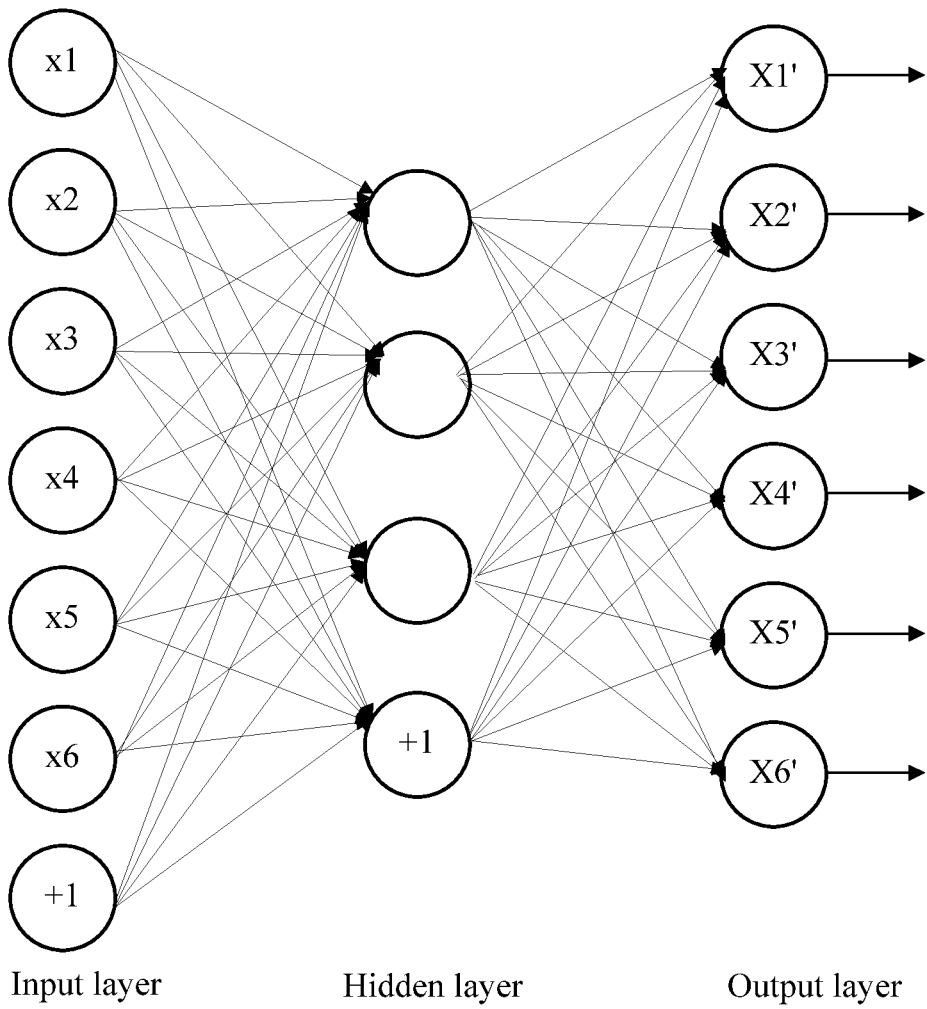
FIG. 3 is a schematic structural diagram of a deep neural network according to an embodiment of the present disclosure.

In this embodiment of the present disclosure, when receiving the foregoing to-be-identified data, a computer inputs the to-be-identified data to a locally saved deep neural network, and acquires category information of the to-be-identified data using the deep neural network. As shown in FIG. 3, the foregoing deep neural network has a multi-layer network structure that includes at least an input layer and an output layer, where the input layer is used to receive original to-be-identified data, and the output layer is used to output identified category information, and at least one hidden layer exist between the input layer and the output layer and is used to process the foregoing to-be-identified data.

Based on the foregoing established deep neural network, the information of the category to which the to-be-identified data belongs is acquired.

Using the foregoing technical solution, data category information is integrated in a deep neural network, thereby overcoming a disadvantage in the prior art that an original model only minimizes a reestablishment error without considering a sample category distribution feature, and implementing a process in which the deep neural network identifies information of a category to which to-be-identified data belongs.

Figure 4:
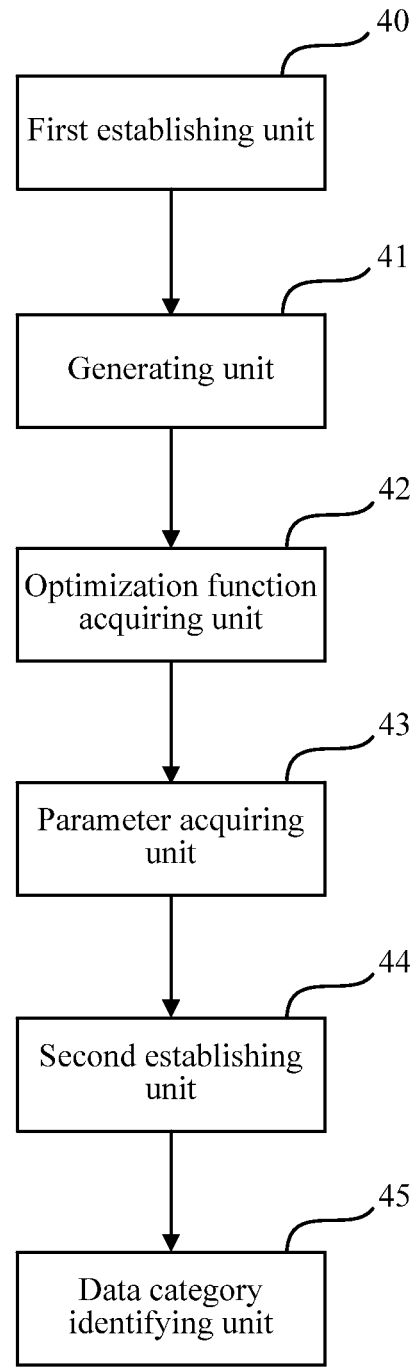
FIG. 4 is a schematic structural diagram of a data category identification apparatus based on a deep neural network according to an embodiment of the present disclosure.

Based on the foregoing technical solution, as shown in FIG. 4, an embodiment of the present disclosure further provides a data category identification apparatus based on a deep neural network, including a first establishing unit 40, a generating unit 41, an optimization function acquiring unit 42, a parameter acquiring unit 43, a second establishing unit 44, and a data category identifying unit 45, where the first establishing unit 40 is configured to establish an initial deep neural network; the generating unit 41 is configured to generate a linear category analysis function after data category information is added to a locally saved initial linear category analysis function according to an input training sample vector set; the optimization function acquiring unit 42 is configured to acquire an optimization function of the initial deep neural network according to a locally saved unsupervised auto-encoding model optimization function and the linear category analysis function; the parameter acquiring unit 43 is configured to acquire a parameter of the initial deep neural network according to the optimization function of the initial deep neural network; the second establishing unit 44 is configured to establish a deep neural network according to a locally saved classification neural network, the initial deep neural network, and the parameter of the initial deep neural network, where the deep neural network has a multi-layer network structure that includes at least an input layer and an output layer; and the data category identifying unit 45 is configured to input to-be-identified data to the input layer of the deep neural network, and acquire information of a category to which the to-be-identified data belongs, where the information of the category is output by the output layer of the deep neural network.

The generating unit 41 is configured to perform relaxation processing on the initial linear category analysis function using a relaxation algorithm, and perform normalization processing on the input training sample vector set; and substitute the training sample vector set on which normalization processing has been performed into the initial linear category analysis function on which relaxation processing has been performed, to generate the linear category analysis function.

Using the foregoing technical solution, relaxation processing is performed on a locally saved initial linear category analysis function, and a restriction condition corresponding to a function during establishment of a deep neural network is blurred, thereby avoiding a problem in the prior art that an amount of calculation of an initial linear category analysis function is large, and effectively reducing calculation complexity on the basis that accuracy of identifying a data category by an established deep neural network is ensured.

The linear category analysis function generated by the generating unit 41 is:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\},$$

where $\zeta_{lda}(W)$ is the linear category analysis function; W is a parameter of the deep neural network, W is a matrix including multiple elements, and the matrix is obtained by learning the training sample vector set on which normalization processing has been performed; $w_k$ is any column vector in the matrix W; $w_k^T$ is a transposition of the column vector $w_k$; both $x_i$ and $x_j$ are training sample vectors in the training sample vector set on which normalization processing has been performed; $x_j^T$ is a transposition of $x_j$; M is a vector pair set including at least one pair of training sample vectors that belong to different categories; C is a vector pair set including at least one pair of training sample vectors that belong to a same category; $(x_i, x_j) \in M$ indicates that $x_i$ and $x_j$ belong to different categories; $(x_i, x_j) \in C$ indicates that $x_i$ and $x_j$ belong to a same category; and K is the total number of column vectors included in the matrix W.

Using the foregoing technical solution, because category information corresponding to the training sample vector set is known, that is, a category information set Y corresponding to a training sample is known, when a linear category analysis function is generated, both $(x_i, x_j) \in C$ and $(x_i, x_j) \in M$ in an initial linear category analysis function formula need to be applied to information of a category to which the training sample vector belongs, which indicates that $y_i$ corresponding to a training sample vector $x_i$ and $y_j$ corresponding to a training sample vector $x_j$ are acquired from the category information set Y, and it is determined whether $x_i$ and $x_j$ belong to a same category. Therefore, it can be seen that, a generated linear category analysis function includes data category information, such that a generated deep neural network can identify information of a category to which to-be-identified data belongs.

The optimization function, which is acquired by the optimization function acquiring unit 42, of the initial deep neural network is: $\zeta = \alpha \zeta_{ae}(W) + (1-\alpha) \zeta_{lda}(W)$, where $\alpha$ is a coefficient of the optimization function of the initial deep neural network, and is preset and acquired according to an application scenario; $\zeta_{ae}(W)$ is the unsupervised auto-encoding model optimization function; $\zeta_{lda}(W)$ is the linear category analysis function; and $\zeta$ is the optimization function of the initial deep neural network.

The parameter acquiring unit 43 is configured to acquire, according to the optimization function of the initial deep neural network and using a backpropagation algorithm, a gradient corresponding to the optimization function of the initial deep neural network; and acquire, using a gradient descent algorithm or a quasi-Newton algorithm, the parameter of the initial deep neural network according to the gradient corresponding to the optimization function of the initial deep neural network.

The second establishing unit 44 is configured to superimpose the classification neural network onto the initial deep neural network to generate an initial deep neural network that is obtained after superimposition processing; and establish, using the backpropagation algorithm, the deep neural network according to the parameter of the initial deep neural network and the initial deep neural network that is obtained after superimposition processing.

Using the foregoing technical solution, a deep neural network is established based on data category information, thereby implementing a category identification function of the deep neural network, and facilitating discovery of an underlying law of to-be-identified data according to category information of the to-be-identified data.

Figure 5:
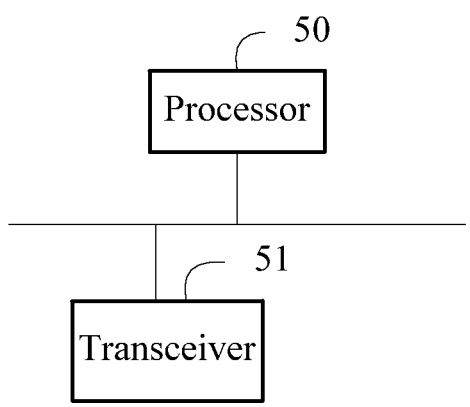
FIG. 5 is a schematic structural diagram of a data category identification device based on a deep neural network according to an embodiment of the present disclosure.

Based on the foregoing technical solution, as shown in FIG. 5, an embodiment of the present disclosure further provides a data category identification device based on a deep neural network, including a processor 50 and a transceiver 51, where the processor 50 is configured to establish an initial deep neural network; the processor 50 is further configured to generate a linear category analysis function after data category information is added to a locally saved initial linear category analysis function according to an input training sample vector set; the processor 50 is further configured to acquire an optimization function of the initial deep neural network according to a locally saved unsupervised auto-encoding model optimization function and the linear category analysis function; the processor 50 is further configured to acquire a parameter of the initial deep neural network according to the optimization function of the initial deep neural network; the processor 50 is further configured to establish a deep neural network according to a locally saved classification neural network, the initial deep neural network, and the parameter of the initial deep neural network, where the deep neural network has a multi-layer network structure that includes at least an input layer and an output layer; the transceiver 51 is configured to receive input to-be-identified data; and the processor 50 is further configured to input the to-be-identified data to the input layer of the deep neural network, and acquire information of a category to which the to-be-identified data belongs, where the information of the category is output by the output layer of the deep neural network.

Optionally, the processor 50 is configured to perform relaxation processing on the initial linear category analysis function using a relaxation algorithm, and perform normalization processing on the input training sample vector set; and substitute the training sample vector set on which normalization processing has been performed into the initial linear category analysis function on which relaxation processing has been performed, to generate the linear category analysis function.

Using the foregoing technical solution, relaxation processing is performed on a locally saved initial linear category analysis function, and a restriction condition corresponding to a function during establishment of a deep neural network is blurred, thereby avoiding a problem in the prior art that an amount of calculation of an initial linear category analysis function is large, and effectively reducing calculation complexity on the basis that accuracy of identifying a data category by an established deep neural network is ensured.

Optionally, the linear category analysis function generated by the processor 50 is:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\},$$

where $\zeta_{lda}(W)$ is the linear category analysis function; W is a parameter of the deep neural network, W is a matrix including multiple elements, and the matrix is obtained by learning the training sample vector set on which normalization processing has been performed; $w_k$ is any column vector in the matrix W; $w^T_k$ is a transposition of the column vector $w_k$; both $x_i$ and $x_j$ are training sample vectors in the training sample vector set on which normalization processing has been performed; $x_j^T$ is a transposition of $x_j$; M is a vector pair set including at least one pair of training sample vectors that belong to different categories; C is a vector pair set including at least one pair of training sample vectors that belong to a same category; $(x_i,x_j) \in M$ indicates that $x_i$ and $x_j$ belong to different categories; $(x_i,x_j) \in C$ indicates that $x_i$ and $x_j$ belong to a same category; and K is the total number of column vectors included in the matrix W.

Using the foregoing technical solution, because category information corresponding to the training sample vector set is known, that is, a category information set Y corresponding to a training sample is known, when a linear category analysis function is generated, both $(x_i,x_j) \in C$ and $(x_i,x_j) \in M$ in an initial linear category analysis function formula need to be applied to information of a category to which the training sample vector belongs, which indicates that $y_i$ corresponding to a training sample vector $x_i$ and $y_j$ corresponding to a training sample vector $x_j$ are acquired from the category information set Y, and it is determined whether $x_i$ and $x_j$ belong to a same category. Therefore, it can be seen that, a generated linear category analysis function includes data category information, such that a generated deep neural network can identify information of a category to which to-be-identified data belongs.

Optionally, the optimization function, which is acquired by the processor 50, of the initial deep neural network is: $\zeta = \alpha \zeta_{ae}(W) + (1-\alpha) \zeta_{lda}(W)$, where $\alpha$ is a coefficient of the optimization function of the initial deep neural network, and is preset and acquired according to an application scenario; $\zeta_{ae}(W)$ is the unsupervised auto-encoding model optimization function; $\zeta_{lda}(W)$ is the linear category analysis function; and $\zeta$ is the optimization function of the initial deep neural network.

Optionally, the processor 50 is configured to acquire, according to the optimization function of the initial deep neural network and using a backpropagation algorithm, a gradient corresponding to the optimization function of the initial deep neural network; and acquire, using a gradient descent algorithm or a quasi-Newton algorithm, the parameter of the initial deep neural network according to the gradient corresponding to the optimization function of the initial deep neural network.

Optionally, the processor 50 is configured to superimpose the classification neural network onto the initial deep neural network to generate an initial deep neural network that is obtained after superimposition processing; and establish, using the backpropagation algorithm, the deep neural network according to the parameter of the initial deep neural network and the initial deep neural network that is obtained after superimposition processing.

Using the foregoing technical solution, a deep neural network is established based on data category information, thereby implementing a category identification function of the deep neural network, and facilitating discovery of an underlying law of to-be-identified data according to category information of the to-be-identified data.

In conclusion, an initial deep neural network is established; a linear category analysis function is generated after data category information is added to a locally saved initial linear analysis function according to an input training sample vector set; an optimization function of the initial deep neural network is acquired according to a locally saved unsupervised auto-encoding model optimization function and the foregoing linear category analysis function; a parameter of the initial deep neural network is acquired according to the optimization function of the foregoing initial deep neural network; a deep neural network is established according to a locally saved classification neural network, the initial deep neural network, and the parameter of the foregoing initial deep neural network; and to-be-identified data is input to an input layer of the deep neural network, and information of a category to which the to-be-identified data belongs is acquired, where the information of the category is output by an output layer of the deep neural network. Using the technical solutions of the present disclosure, a deep neural network is established based on data category information, such that category information of to-be-identified data is conveniently and rapidly obtained using the deep neural network, thereby implementing a category identification function of the deep neural network, and facilitating discovery of an underlying law of the to-be-identified data according to the category information of the to-be-identified data.

Persons skilled in the art should understand that the embodiments of the present disclosure may be provided as a method, a system, or a computer program product. Therefore, the present disclosure may use a form of hardware-only embodiments, software-only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct a computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, such that a series of operations and steps are performed on the computer or any other programmable device, so as to generate computer-implemented processing. Therefore, the instructions executed on the computer or any other programmable device provide steps for implementing a specific function in one or more processes in the flowcharts and/or in one or more blocks in the block diagrams.

Although exemplary embodiments of the present disclosure have been described, persons skilled in the art may make changes and modifications to these embodiments once they learn the basic inventive concept. Therefore, the appended claims are intended to be construed as to cover the exemplary embodiments and all changes and modifications falling within the scope of the present disclosure.

Obviously, persons skilled in the art may make various modifications and variations to the embodiments of the present disclosure without departing from the spirit and scope of the embodiments of the present disclosure. The present disclosure is intended to cover these modifications and variations provided that they fall within the scope defined by the claims in the embodiments of the present disclosure and their equivalent technologies.

What is claimed is:

1. A data category identification method based on a deep neural network for an apparatus comprising a memory and a processor, the method comprising:
    establishing an initial deep neural network;
    generating a linear category analysis function after data category information is added to a locally saved initial linear category analysis function in the memory, the linear category analysis function being generated from an input training sample vector set;
    generating an optimization function of the initial deep neural network from a locally saved unsupervised auto-encoding model optimization function in the memory and the linear category analysis function;
    acquiring a parameter of the initial deep neural network from the optimization function of the initial deep neural network;
    generating the deep neural network from a locally saved classification neural network in the memory, the initial deep neural network, and the parameter of the initial deep neural network, the deep neural network having a multi-layer network structure comprising at least an input layer and an output layer;
    receiving to-be-identified data from a user device and inputting the to-be-identified data to the input layer of the deep neural network, the to-be-identified data comprising image information or text information;
    applying the deep neural network to the image information or the text information comprising the to-be-identified data to obtain information for a category of the to-be-identified data;
    determining information for the category of the to-be-identified data in the image information or the text information in response to applying the deep neural network to the image information or the text information; and
    outputting the information for the category by the output layer of the deep neural network to permit categorization of the to-be-identified data, the linear category analysis function $\zeta_{lda}$ (W) being:

$$\zeta_{lda}(W) = \sum_{k=1}^{K} \left\{ \sum_{(x_i,x_j) \in M} w_k^T x_i x_j^T w_k - \sum_{(x_i,x_j) \in C} w_k^T x_i x_j^T w_k \right\}$$

W being a parameter of the deep neural network and comprising a matrix W including multiple elements, and the matrix W being obtained by learning the normalized training sample vector set,
$w_k$ being any column vector in the matrix W,
$w^T_k$ being a transposition of the column vector $w_k$,
both $x_i$ and $x_j$ being training sample vectors in the normalized training sample vector set,
$x_j^T$ being a transposition of $x_j$,
M being a first vector pair set comprising at least one pair of training sample vectors that belong to different categories,
C being a second vector pair set comprising at least one pair of training sample vectors that belong to a same category,
$(x_i,x_j) \in M$ indicating that $x_i$ and $x_j$ belong to different categories,
$(x_i,x_j) \in C$ indicating that $x_i$ and $x_j$ belong to a same category, and
k being the total number of column vectors in the matrix W.

2. The method of claim 1, wherein the optimization function of the initial deep neural network is:

$$\zeta = \alpha \zeta_{ae}(W) + (1-\alpha)\zeta_{lda}(W)$$

α being a coefficient of the optimization function of the initial deep neural network, and is preset and acquired based on an application scenario, $\zeta_{ae}$ (W) being the unsupervised auto-encoding model optimization function, $\zeta_{lda}$ (W) being the linear category analysis function, and ζ being the optimization function of the initial deep neural network.

3. The method of claim 1, wherein acquiring the parameter of the initial deep neural network using the optimization function of the initial deep neural network comprises:
    acquiring a gradient corresponding to the optimization function of the initial deep neural network; and
    acquiring, using a gradient descent algorithm or a quasi-Newton algorithm, the parameter of the initial deep neural network based on the gradient corresponding to the optimization function of the initial deep neural network.

4. The method of claim 1, wherein establishing the deep neural network based on the locally saved classification neural network, the initial deep neural network, and the parameter of the initial deep neural network comprises:
    superimposing the classification neural network onto the initial deep neural network to generate a superimposed initial deep neural network that is obtained after superimposition processing; and
    establishing, using a backpropagation algorithm, the deep neural network based on the parameter of the initial deep neural network and the initial deep neural network that is obtained after superimposition processing.

5. A data category identification apparatus based on a deep neural network, comprising:

a memory comprising instructions; and
a processor coupled to the memory, wherein the instructions cause the processor to be configured to:
  establish an initial deep neural network;
  generate a linear category analysis function after data category information is added to a locally saved initial linear category analysis function, the linear category analysis function being generated from an input training sample vector set;
  generate an optimization function of the initial deep neural network, the optimization function being acquired from a locally saved unsupervised auto-encoding model optimization function and the linear category analysis function;
  acquire a parameter of the initial deep neural network from the optimization function of the initial deep neural network;
  generate the deep neural network from a locally saved classification neural network, the initial deep neural network, and the parameter of the initial deep neural network, the deep neural network having a multi-layer network structure comprising at least an input layer and an output layer;
  receive to-be-identified data from a user device and inputting the to-be-identified data to the input layer of the deep neural network, the to-be-identified data comprising image information or text information;
  apply the deep neural network to the image information or the text information comprising the to-be-identified data to obtain information for a category of the to-be-identified data;
  determine information for the category of the to-be-identified data in the image information or the text information in response to applying the deep neural network to the image information or the text information; and
  output the information for the category by the output layer of the deep neural network to permit categorization of the to-be-identified data, the linear category analysis function $\zeta_{lda}(W)$ being:

$$\zeta_{lda}(W) = \sum_{k=1}^{K} \left\{ \sum_{(x_i, x_j) \in M} w_k^T x_i x_j^T w_k - \sum_{(x_i, x_j) \in C} w_k^T x_i x_j^T w_k \right\}$$

W is a parameter of the deep neural network and comprises a matrix W including multiple elements, and the matrix W is obtained by learning the normalized training sample vector set,
$w_k$ being any column vector in the matrix W,
$w^T_k$ being a transposition of the column vector $w_k$,
both $x_i$ and $x_j$ being training sample vectors in the normalized training sample vector set,
$X_j^T$ being a transposition of $x_j$,
M being a first vector pair set comprising at least one pair of training sample vectors that belong to different categories,
C being a second vector pair set comprising at least one pair of training sample vectors that belong to a same category,
$(x_i, x_j) \in M$ indicating that $x_i$ and $x_j$ belong to different categories,
$(x_i, x_j) \in C$ indicating that $x_i$ and $x_j$ belong to a same category, and k being the total number of column vectors in the matrix W.

6. The apparatus of claim 5, wherein the optimization function of the initial deep neural network is:

$$\zeta = \alpha \zeta_{ae}(W) + (1-\alpha)\zeta_{lda}(W)$$

$\alpha$ being a coefficient of the optimization function of the initial deep neural network, and is preset and acquired based on an application scenario, $\zeta_{ae}(W)$ being the unsupervised auto-encoding model optimization function, $\zeta_{lda}(W)$ being the linear category analysis function, and $\zeta$ being the optimization function of the initial deep neural network.

7. The apparatus of claim 5, wherein the instructions further cause the processor to be configured to:
  acquire, based on the optimization function of the initial deep neural network and using a backpropagation algorithm, a gradient corresponding to the optimization function of the initial deep neural network; and
  acquire, using a gradient descent algorithm or a quasi-Newton algorithm, the parameter of the initial deep neural network based on the gradient corresponding to the optimization function of the initial deep neural network.

8. The apparatus of claim 5, wherein the instructions further cause the processor to be configured to:
  superimpose the classification neural network onto the initial deep neural network to generate a superimposed initial deep neural network that is obtained after superimposition processing, and
  establish, using a backpropagation algorithm, the deep neural network based on the parameter of the initial deep neural network and the initial deep neural network that is obtained after superimposition processing.

9. A non-transitory computer readable medium storing codes which, when executed by a processor of a network system causes the processor to:
  establish an initial deep neural network;
  generate a linear category analysis function after data category information is added to a locally saved initial linear category analysis function, the linear category analysis function being generated from an input training sample vector set;
  generate an optimization function of the initial deep neural network, the optimization function being acquired from a locally saved unsupervised auto-encoding model optimization function and the linear category analysis function;
  acquire a parameter of the initial deep neural network from the optimization function of the initial deep neural network;
  generate the deep neural network from a locally saved classification neural network, the initial deep neural network, and the parameter of the initial deep neural network, the deep neural network having a multi-layer network structure comprising at least an input layer and an output layer;
  receive to-be-identified data from a user device and input the to-be-identified data to the input layer of the deep neural network, the to-be-identified data comprising image information or text information;
  apply the deep neural network to the image information or the text information comprising to-be-identified data to obtain information for a category of the to-be-identified data;
  determine information for the category of the to-be-identified data in the image information or the text information in response to applying the deep neural network to the image information or the text information; and output the information for the category by the output layer of the deep neural network to permit categorization of the to-be-identified data, the linear category analysis function $\zeta_{lda}(W)$ being:

$$\zeta_{lda}(W) = \sum_{k=1}^{K} \left\{ \sum_{(x_i, x_j \in M)} w_k^T x_i x_j^T w_k - \sum_{(x_i, x_j \in C)} w_k^T x_i x_j^T w_k \right\}$$

W being a parameter of the deep neural network and comprising a matrix W including multiple elements, and the matrix W being obtained by learning the normalized training sample vector set, $w_k$ being any column vector in the matrix W, $w^T_k$ being a transposition of the column vector $w_k$, both $x_i$ and $x_j$ being training sample vectors in the normalized training sample vector set, $x_j^T$ being a transposition of $x_j$, M being a first vector pair set comprising at least one pair of training sample vectors that belong to different categories, C being a second vector pair set comprising at least one pair of training sample vectors that belong to a same category, $(x_i, x_j) \in M$ indicating that $x_i$ and $x_j$ belong to different categories, $(x_i, x_j) \in C$ indicating that $x_i$ and $x_j$ belong to a same category, and k being the total number of column vectors in the matrix W.

10. The method of claim 1, wherein generating the linear category analysis function after data category information is added to the locally saved initial linear category analysis function comprises:

performing relaxation processing on the initial linear category analysis function using a relaxation algorithm;

performing normalization processing on the input training sample vector set to generate a normalized training sample vector set; and substituting the normalized training sample vector set into the initial linear category analysis function on which relaxation processing has been performed to generate the linear category analysis function.

11. The apparatus of claim 5, wherein the instructions further cause the processor to be configured to:

perform relaxation processing on the initial linear category analysis function using a relaxation algorithm;

perform normalization processing on the input training sample vector set to generate a normalized training sample vector set; and substitute the normalized training sample vector set into the initial linear category analysis function on which relaxation processing has been performed to generate the linear category analysis function.

12. The non-transitory computer readble medium of claim 9, wherein the processor is further configured to:

perform relaxation processing on the initial linear category analysis function using a relaxation algorithm;

perform normalization processing on the input training sample vector set to generate a normalized training sample vector set; and substitute the normalized training sample vector set into the initial linear category analysis function on which relaxation processing has been performed in order to generate the linear category analysis function.

* * * * *

UNITED STATES PATENT AND TRADEMARK OFFICE
CERTIFICATE OF CORRECTION

PATENT NO. : 10,296,827 B2
APPLICATION NO. : 14/944294
DATED : May 21, 2019
INVENTOR(S) : Guangjian Tian, Cheng He and Wei Fan It is certified that error appears in the above-identified patent and that said Letters Patent is hereby corrected as shown below:

On the Title Page

Item (30), Line 1: "201410242182" should read "201410242182.3"

Page (2), Item (56), OTHER PUBLICATIONS, Line 13: "pp. 13-45" should read "pp. 43-45"

Signed and Sealed this
Twenty-third Day of July, 2019

Andrei Iancu
*Director of the United States Patent and Trademark Office*